United States Patent Office 3,488,720
Patented Jan. 6, 1970

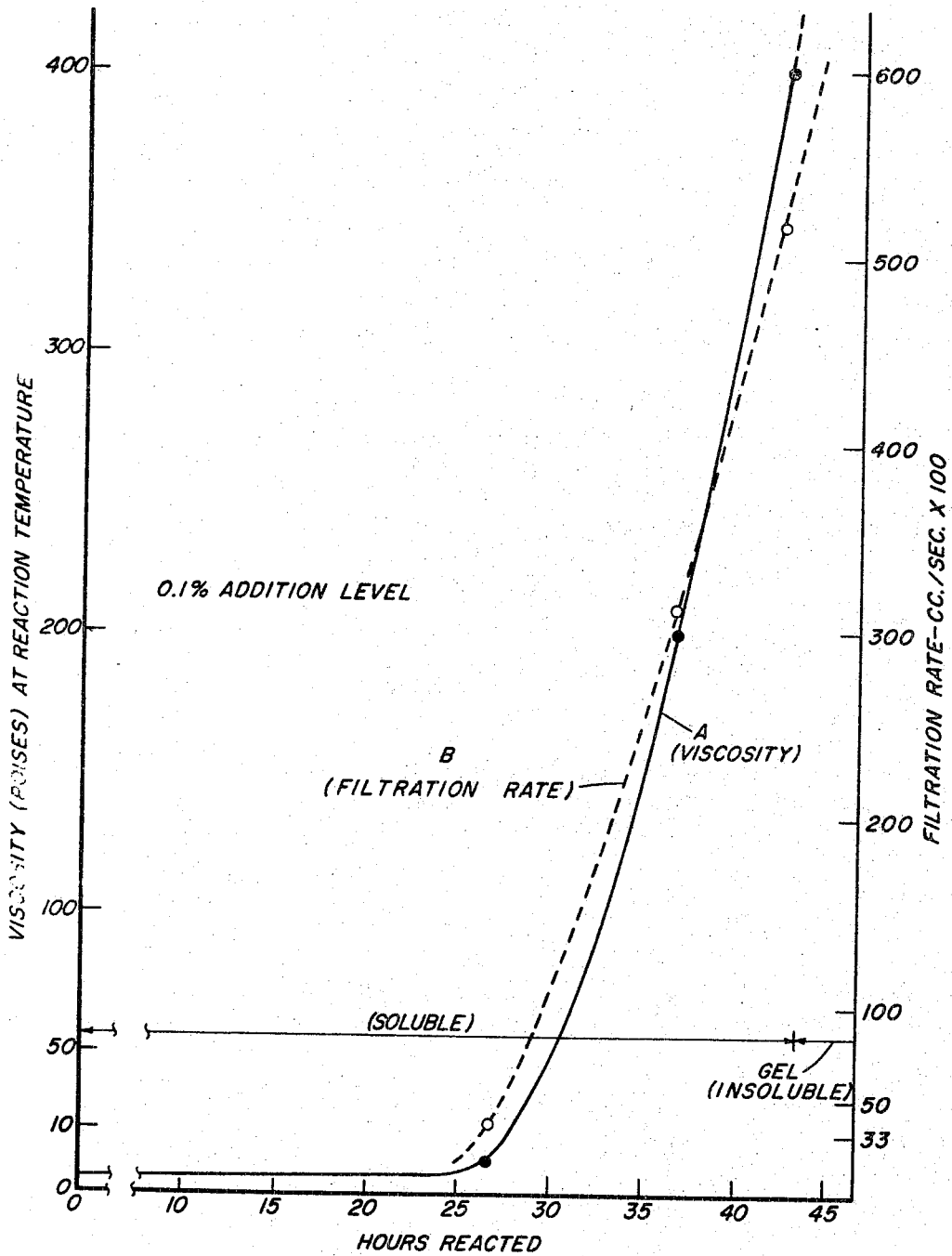

3,488,720
PROCESS OF MANUFACTURING POLYACRYL-AMIDE-BASED FLOCCULANT AND FLOCCULATIONS THEREWITH
Daniel Elmer Nagy and Laurence Lyman Williams, Stamford, and Anthony Thomas Coscia, South Norwalk, Conn., assignors to American Cyanamid Company, Stamford, Conn., a corporation of Maine
Filed Apr. 6, 1967, Ser. No. 629,028
Int. Cl. C02b 1/20; C08f 3/84
U.S. Cl. 210—54                        10 Claims

ABSTRACT OF THE DISCLOSURE

A polyacrylamide which is water-soluble, cationic, and cross-linked is prepared by subjecting a water-soluble polyacrylamide to transamidation with a water-soluble poly-primary amine until the viscosity of the reaction mixture increases abruptly and preferably until the polymer is on the verge of conversion to a water-insoluble gel product is a flocculant for solids in dilute aqueous suspension.

The present invention relates to a method for the preparation of cationic, water-soluble, cross-linked polymers particularly useful as flocculating agents. The invention includes the polymers themselves and a process for flocculating, by means of these polymers, anionic particles in aqueous suspension.

Williams et al. application Ser. No. 628,979 filed herewith discloses a method for preparing water-soluble thermosetting cationic polyacrylamides which are useful as flocculating agents. The polyacrylamides are prepared by transamidation of a water-soluble polyacrylamide with a water-soluble polyamine.

The discovery has now been made that a polyacrylamide of superior effectiveness as flocculating agent can be prepared by forming a reaction mixture consisting essentially of a water-soluble substantially linear polyacrylamide in a stoichiometric excess of a water-soluble di-primary amine (i.e., a water-soluble amine containing two or more primary amino substituents), heating the solution at a temperature at which the solution remains a single phase and at which transamidation of the polyacrylamide with the poly-primary amine occurs, and terminating the heating after the viscosity of the solution has increased abruptly and before a polymer is formed which is a water-insoluble gel. As the reaction proceeds, the di-primary amine acts as cross-linking agent, with consequent formation of three-dimensional macromolecules.

The invention is based on our discovery that a polyacrylamide of cross-linked structure and high cationic density is produced when in the above-described reaction the di-primary amine is present throughout in large stoichiometric excess and when the reaction is terminated as close as is practically possible to the point at which the polymer becomes a water-insoluble gel. We have further found that polymers prepared in this manner possess substantially greater power as flocculating agents than similar polymers prepared in other manners, for example, as disclosed in said copending application.

The criticality of carrying the reaction well beyond the point at which the viscosity of the reaction mixture rises abruptly and preferably until the mixture is just short of the point of becoming a water-insoluble gel is illustrated by the graphs in the attached drawing, which is based on the procedure of Example 1 (a transamidation performed in the absence of inert solvent). The graph represented by a solid line shows the changes in viscosity which the reaction mixture undergoes as a function of time during heating, and the dotted graph shows the flocculating power of the reaction mixture as it increases in molecular complexity.

The viscosity curve shows that for the longest period of time in the process (here approximately 26 hours) the reaction mixture undergoes substantially no increase in viscosity. During this period aminoalkyl substituents become attached to the amide substituents of the polyacrylamide and towards the end of the period a small number of these substituents have reacted poly-functionally, joining two amide substituents together and thereby acting as cross-linking agents. The number of such cross-linkages, however, are few.

Shortly thereafter the viscosity curve abruptly changes its slope and rises sharply. This upward course is clearly evident by the 28th hour. Up to about the 42nd hour the polymer is still water-soluble and a significant number of the amide substituents have reacted with the di-primary amine.

At about the 44th hour of heating, the polymer passes from water-soluble state to a state in which it is substantially insoluble in water, even to the extent of 1%.

The dotted line shows the flocculating power of the polymer (at 0.1% concentration for organic suspended solids) as the reaction proceeds. The flocculating power of the polymer is virtually nil at the start, rises sharply at the abrupt change in viscosity, and reaches a maximum just before the point at which the polymer becomes water-insoluble. The rise in flocculating power becomes of practical significance when half or more of the time has passed which extends between the point at which the abrupt rise in flocculating power occurs and the point at which the polymer becomes water-insoluble.

Since the polymer, just before the point at which it becomes water-insoluble, is storage-stable, it will be appreciated that a product of maximum flocculating power is obtained when the reaction is terminated while the product is water-soluble and immediately before it has become a water-insoluble gel.

In practice a polymer of virtually maximum flocculating power is obtained when the reaction is stopped when more than 90% of the time has elapsed between the abrupt rise in the curve and attainment of the water-insoluble gel state. Moreover, it is advantageous to stop the reaction before more than 95% of said time has elapsed. By stopping the reaction at a point between these two limits of time, a polymer is obtained which possesses excellent power as a flocculating agent, yet the danger of forming a water-insoluble product is minimized.

The point at which the polymer becomes a water-insoluble gel varies with such factors as the amount of excess di-primary amine (and inert solvent) present during the reaction, the presence of diluent linkages in the polyacrylamide, the reactivity of the particular di-primary amine (or mixture of di-primary amines), and the amount of water present in the reaction mixture. The point at which gelation occurs is consequently most easily determined by making a pilot run in the laboratory, the reaction being continued until formation of the water-insoluble gel occurs. A large-scale run can then be made in the same manner except that the reaction is terminated shortly (for example, an hour) before the insoluble stage is reached.

Our evidence is that a polymer of best flocculating power is obtained when the reaction of the polyacrylamide with the alkylenepolyamine is performed under substantially anhydrous conditions, that is, when the reaction mixture contains less than 5% and better still, less than 1% water by weight.

The anhydrous reaction is performed by mixing the polyacrylamide and the di-primary amine in desired proportion and heating the mixture to the point at which the two form a single solution. Thereafter the temperature is slowly raised, the rate at which the temperature is elevated being controlled so that the formation of two phases is avoided. The formation of a second phase can readily be detected by eye and is evidence that the temperature should be lowered or the rate of heating should be decreased. At the same time a plot is made of the viscosity of the reaction mixture as a function of time. An abrupt rise in viscosity is evidence that the end point of the reaction is close at hand.

The speed of the reaction is increased by the presence in the reaction mixture of an inert solvent for polyacrylamide, for example, ethylene glycol. Such a solvent may be used to replace part of the excess di-primary amine which otherwise would be present.

At the end of the reaction, if desired, the unreacted di-primary amine present may be recovered by mixing a selective solvent for the di-primary amine with the reaction mixture. A preferred solvent for this purpose is isopropyl alcohol; typically six volumes of alcohol are used per part of the reaction mixture. The polyamine (and any water present) dissolve in the isopropyl alcohol. The polymer precipitates and can be recovered by filtration or centrifugation.

The unreacted amine can also be recovered by vacuum distillation; the polymer is non-volatile.

Water is tolerated well by the reaction and leads to a product of satisfactory but decreased flocculating power. Moreover, when water is present, the above-described abrupt change in viscosity is less apparent, and the endpoint is most conveniently determined from a pilot run.

The starting polyacrylamide may be polyacrylamide itself or a water-soluble copolymer of acrylamide with a minor amount of one or more non-anionic monomers copolymerizable therewith, for example, ethyl acrylate, methyl methacrylate, acrylonitrile, trimethyl p-vinylphenyl ammonium chloride, styrene, etc. It will be understood that when the polyacrylamide contains a linkage containing an ester substituent such as is introduced, for example, by the use of methyl acrylate as a co-monomer, some of the di-primary amine may undergo aminolysis with the ester substituent, in which event a correspondingly larger amount of the di-primary amine should be employed. Polyacrylamide itself is preferred as the starting polymeric material because the products of the transamidation reaction are non-inflammable, its transamidation product with a di-primary amine is highly resistant to hydrolysis on storage, and this product is highly efficient as a flocculant. In general, a superior product is obtained when the molecular weight of the polyacrylamide is high, rather than low.

The di-primary amines with which the polyacrylamide is condensed are di- (or higher) primary amines and include ethylenediamine, trimethylenediamine, cadaverine, as well as di-primary amines containing secondary and tertiary amino groups, for example, diethylenetriamine, dipropylenetriamine, tetraethylenepentamine, and the low molecular weight condensation products of ammonia with epichlorohydrin, for example, 1,3-diamino-2-propanol. Ethylenediamine itself is preferred because of the excellent results which it affords and its cheapness, and because any unreacted excess can easily be recovered and reused.

The amount of di-primary amine which is used varies from instance to instance. In any instance the minimum effective amount can be readily found by laboratory trial, by forming a reaction mixture as has been described and plotting the increase of viscosity of the reaction mixture as a function of time. Failure of a slow but regular rise in viscosity to occur followed by an abrupt break into a upward clamb is evidence that the amount of di-primary amine used is insufficient. An excess of di-primary amine is advantageous. The excess postpones the point at which the insoluble gel forms, and improves the flocculating properties of the resulting polymer. There does not appear to be any limit to this excess, but the improvements taper off to small values for additional increment when more than 15 mols of di-primary amine are present per mol of acrylamide linkages present.

The transamidation reaction is stopped by cooling the reaction mixture to room temperature and acidification to about pH 5. The mixture is stable, and dilution with water is unnecessary.

The anhydrous polymer, free from di-primary amine (as recovered, for example, from isopropyl alcohol) is stable and does not require acidification.

The polymer of the present invention is most conveniently employed as flocculating agent by dilution to 0.5–5% solids by addition of water to permit uniform admixture with the suspension to be clarified and metering the solution (adjusted to a mildly alkaline pH). Where the polymer is prepared within a few days of use, it need not be acidified and can be introduced directly into the suspension to be clarified, preferably after dilution with water to a low concentration to facilitate metering and mixing. Suitable dosage rates generally lie in the range between 0.001% and 1% (polymer solids based on the weight of the solution). The suspension is then allowed to stand. Flocculation proceeds rapidly, after which the flocs can be removed by filtration or other conventional practice.

The solutions are useful for flocculating the highly particulate suspended matter in sewage, coal mine effluent, and paper mill white water, as well as the inorganic muddy suspension when these suspended solids are of anionic character.

The properties of the polymer of the present invention as flocculant is due to the fact that the individual molecules possess a high positive (cationic) charge density while being of very large dimensions. The polyamine used acts both as a monofunctional reagent which attaches highly cationic primary amino substituents into the polymeric molecule and as cross-linking agent. The macromolecule is non-right so that it collapses when attracted to the surface of an oppositely charged suspended particle and when present in sufficient amount; it effects a major and opposite change in the electrostatic charge of the particle, reducing the charge nearly to zero and thereby causing rapid flocculation.

Where the polymer solution of the present invention is prepared in situ, the solution may be diluted to the indicated extent in one step and acidified, after which it is storage-stable.

The invention will be more particularly illustrated by the examples which follow. These examples constitute best embodiments of the invention and are not to be construed as limitations thereon.

EXAMPLE 1

The following illustrates a preferred method of the present invention, showing the use of a commercial polyacrylamide of low-medium molecular weight as starting material and the importance of continuing the reaction until the viscosity of the reaction mixture has risen abruptly.

In a round-bottomed flask fitted with thermometer, stirrer, and electric heating mantle are placed 40 g. (0.57 mol) of polyacrylamide and 800 g. (13.3 mol) of ethylenediamine. The polyacrylamide has a molecular weight of 120,000; it is composed of acrylamide and acrylic acid linkages in 98:2 molar ratio. Both reagents contain 1% by weight of water. The mixture is heated to 67° C. to form the reagents into a solution; the solution is a mobile liquid having a viscosity of about 3 poises.

The temperature of the mixture is gradually and almost uniformly raised over 42 hours to 97° C., at such a rate that the mixture remains a single phase (i.e., a uniform solution) during all of the heating.

The viscosity of the solution is about 5 poises after the first 26 hours of heating. The viscosity rises abruptly during the following 10 hours of heating. After a total of 42 hours of heating, the solution is a viscous gel which is water-soluble. After an additional two hours of heating, the polymer is water-insoluble.

Samples of the reaction mixture are removed after the hours of heating shown in the table below. The polymeric contents thereof are recovered by pouring the samples at 30° C. into six volumes of isopropyl alcohol; the polymeric product precipitates and is recovered by filtration. The ethylene-diamine which remains unreacted (i.e., the ethylenediamine in stoichiometric excess) dissolves in the isopropanol and can be recovered therefrom.

The flocculating efficiencies of the polymer products thus recovered are determined by dissolving the polymers in water to 1% solids and adding the resulting solutions to uniform samples of a standard sewage at pH 7 in amount sufficient to supply the amounts of polymer shown in the table below.

The samples are stirred gently and allowed to stand for a few minutes, after which the samples are filtered through laboratory standard filter paper and the volume of filtrate which passes through the paper in 100 seconds is determined. The higher the flocculation of the solids in the sewage, the faster is the filtration rate.

Results are as follows, shown in comparison with the results obtained with unreacted polyacrylamide and unreacted ethylenediamine as controls.

| Run No.: | Hours reacted [1] | Viscosity, cp. | Amount polymer added [2] | Filtration rate, cc./100 sec. |
|---|---|---|---|---|
| 1 | [3] | | 0.3 | [6] |
| 2 | [4] | | 0.2 | [6] |
| 3 | 5 | 3 | 0.3 | [6] |
| 4 | 13 | 3 | | |
| 5 | 18.5 | 4 | | |
| 6 | | | 0.1 | 3.62 |
| 7 | 26 | 5 | 0.2 | 2.50 |
| 8 | | | 0.3 | 1.90 |
| 9 | 36.5 | 210 | 0.1 | 31.2 |
| 10 | | | 0.2 | 20.4 |
| 11 | | | 0.1 | 55.5 |
| 12 | 42 | 400 | 0.2 | 52.6 |
| 13 | | | 0.3 | 31.2 |
| 14 | 44 | [5] Gel | | |

[1] Hours after reaction mixture reaches 67° C.
[2] Gm. polymer added per 300 ml. of sewage.
[3] Polyacrylamide (control 1).
[4] Ethylenediamine (control 2).
[5] Insoluble.
[6] Few drops.

The results shown that best flocculation is achieved by the product which had been reacted for 42 hours and which was just short of gelation.

EXAMPLE 2

The following illustrates the process of the present invention applied to the use of a very low molecular weight polyacrylamide as the starting material.

A mixture of 100 g. (1.43 mol) of polyacrylamide (molecular weight 7,000; carboxyl content 3 mol percent; water content 1% by weight) and 500 ml. (6.6 mol) of ethylenediamine containing 2% of water is formed into a clear solution by heating at 60° C. in the apparatus of Example 1. The temperature of the solution is then raised to 116° C. at as fast a rate as the solution will tolerate without becoming cloudy. The solution is maintained at 116° C. for 7 hours, at which point the viscosity of the solution abruptly increases. After two hours of additional heating, the solution is very viscous but water-soluble. From a prior performance of the procedure, it is known that at this point the polymer is very close to the water-insoluble gel state. The reaction is terminated by cooling the mixture to 20° C.

The polymer is recovered by precipitation from isopropanol. It is about as effective a flocculant as the polymer of Example 1 which had been reacted for 42 hours.

EXAMPLE 3

The procedure of Example 2 is repeated except that the ethylenediamine is replaced by an equal weight of diethylenetriamine. A similar product is obtained.

EXAMPLE 4

To 1000 cc. of a 3% by weight substantially self-sustaining aqueous (pH 8) suspension of iron ore tailings and shale is added a few cc. of a 0.1% solution of the polymer of Example 2. The suspended matter agglomerates rapidly and precipitates, leaving the aqueous phase substantially clear.

EXAMPLE 5

The procedure of Example 4 is repeated except that the suspension contains coal mine slimes. Similar rapid flocculation and precipitation occur.

EXAMPLE 6

The following illustrates the process of the present invention wherein a part of the excess di-primary amine is replaced with a glycol solvent for polyacrylamide and illustrates the effect of the glycol in shortening the time required to reach the stage at which the viscosity of the reaction mixture makes its abrupt increase.

To 100 ml. of ethylene glycol in a flask fitted with stirrer, thermometer, and electric heating mantle is added 19.5 g. of polyacrylamide (molecular weight 120,000) at 95° C. When a solution forms, there is then added over 20 minutes 250 ml. of ethylenediamine. A plot is kept of the viscosity of the reaction mixture. After three hours at 90°–95° C., there is an abrupt rise in the curve.

The reaction is stopped by adding the reaction mixture to two liters of isopropyl alcohol. The polymer is recovered by filtration and dried. It has a neutralization equivalent of 313, which showed that it was considerably more transamidated than the polymer prepared by heating the same amounts of ethylenediamine and polyacrylamide alone at 70°–90° C. for 16 hours which has a neutralization equivalent of 550. However, the product is an effective flocculant for sewage.

EXAMPLE 7

The following illustrates a rapid transamidation using a solvent.

To 10 g. of polyacrylamide of 120,000 molecular weight (0.141 mol) at 90° C. is added first 50 ml. of ethylene glycol at 90° C. and then 26.8 g. (0.440 mol) of ethylenediamine at 20° C. is added in one portion with stirring. After 15 minutes on a steam bath, the reaction mixture is close to gelation and hence 500 g. of isopropyl alcohol is added at once. The recovered polymer, after drying, has a neutralization equivalent of 660, which indicates that approximately 12.5% of the amide groups have been substituted by ethylenediamine. The product is an effective flocculant for sewage.

EXAMPLE 8

The following illustrates a synthesis of a polymer of the present invention wherein a polyalkylenepolyamine is the di-primary amine.

A mixture of 25 g. of polyacrylamide of 7,000 molecular weight and 200 ml. of diethylenetriamine is heated slowly to 90° C. over 6 hours, then to 114° C. over 4 more hours, and then at 114° C. for 8 hours, at which point the reaction mixture is on the verge of gelation. The polymer is precipitated by addition of benzene, recovered by filtration, and dried. It is very effective as a flocculant.

We claim:
1. A process for the manufacture of a water-soluble cationic cross-linked thermosetting polyacrylamide, which consists essentially in: forming a reaction mixture consisting essentially of a solution of a water-soluble substantially linear polyacrylamide in a stoichiometric ex- cess of a water-soluble amine containing not more than 20 carbon atoms and two primary amino groups; heating said solution at a temperature at which said solution remains a single phase and at which transamidation and cross-linking of said polyacrylamide occurs until the viscosity of said solution increasese abruptly; continuing said heating; and terminating said heating after more than one-half of the time has elapsed which extends between said abrupt increase in viscosity and conversion of said polymer at said temperature to a water-insoluble gel.

2. A process according to claim 1 wherein the reaction mixture contains less than 5% water by weight.

3. A process according to claim 1 wherein the molar ratio of the amine to the amide substituents of said polyacrylamide is between 3:1 and 30:1.

4. A process according to claim 1 wherein the amine is ethylenediamine.

5. A process according to claim 1 wherein the heating is terminated when between 90% and 95% of the time has elapsed which extends between said abrupt increase in viscosity and conversion of said polymer to water-insoluble gel state.

6. A process according to claim 1 wherein the reaction mixture contains a solvent for polyacrylamide.

7. A polymer prepared by a method according to claim 1.

8. A process of flocculating anionic particulate matter in aqueous suspension, which comprises adding to said suspension an effective amount therefor of a dilute aqueous solution of a transamidated and cross-linked polyacrylamide prepared according to claim 1.

9. A process according to claim 8 wherein the suspension is sewage.

10. A process according to claim 8 wherein the suspension is papermill white water.

References Cited

UNITED STATES PATENTS

| | | | |
|---|---|---|---|
| 2,486,192 | 10/1949 | Minsh et al. | 260—89.7 |
| 3,014,896 | 12/1961 | Colwell et al. | 260—80.3 |
| 3,170,901 | 2/1965 | Melamed et al. | 260—89.7 |
| 3,235,490 | 2/1966 | Goren | 210—52 |

FOREIGN PATENTS 896,967   6/1962   Great Britain.

JOSEPH L. SCHOFER, Primary Examiner

WILLIAM HAMROCK, Assistant Examiner

U.S. Cl. X.R.

260—80.3, 88.1, 89.5, 89.7

UNITED STATES PATENT OFFICE
CERTIFICATE OF CORRECTION

Patent No. 3,488,720      Dated January 6, 1970

Inventor(s) Daniel Elmer Nagy, and Laurence Lyman Williams, and Anthony Thomas Coscia It is certified that error appears in the above-identified patent and that said Letters Patent are hereby corrected as shown below:

Column 3, line 72, "clamb" should be spelled -- climb --. Column 4, line 41, "non-right" should be spelled -- non-rigid --. In the table in Column 5, "$^5$ Gel" should be -- Gel $^5$ --. The Great Britain reference "896,967" should be -- 898,967 --.

SIGNED AND SEALED
NOV 10 1970

(SEAL)
Attest:

Edward M. Fletcher, Jr.
Attesting Officer

WILLIAM E. SCHUYLER, JR.
Commissioner of Patents